United States Patent Office 3,636,117
Patented Jan. 18, 1972

3,636,117
PROCESS FOR MAKING 4,4'-METHYLENE BIS
(2-CHLOROANILINE)
Guenther Kurt Hoeschele, Wilmington, Del., assignor to
E. I. du Pont de Nemours and Company, Wilmington,
Del.
No Drawing. Filed Sept. 3, 1968, Ser. No. 757,158
Int. Cl. C07c 85/08
U.S. Cl. 260—570 D                    4 Claims

ABSTRACT OF THE DISCLOSURE

A process of manufacturing 4,4'-methylene bis(2-chloraniline) by condensing ortho-chloroaniline with formaldehyde in the presence of hydrochloric acid, the molar ratio of ortho-chloraniline to formaldehyde being 1.9–2.0:1 and the molar ratio of hydrochloric acid to ortho-chloroaniline being at least 1.35:1.

BACKGROUND OF THE INVENTION

This invention relates to the manufacture of 4,4'-methylene bis(2 - chloroaniline), hereinafter called MOCA, which is widely used as a curing agent for polyurethane prepolymers. MOCA is generally prepared in the following fashion: water, sulfuric acid and ortho-chloroaniline are mixed together in appropriate proportions forming an amine salt slurry and the formaldehyde is added yielding an amine-formaldehyde intermediate. The temperature is raised to rearrange the intermediate yielding MOCA as an acid salt. A sodium hydroxide caustic solution is then added to neutralize the acid salt yielding free MOCA and an aqueous inorganic salt solution.

Methods for the preparation of MOCA by the condensation of ortho-chloroaniline and formaldehyde are well known in the art. For example, ortho-chloroaniline can be condensed with formaldehyde in the presence of sulfuric acid as described in U.S. Pat. 3,358,025 and U.S. application Ser. No. 426,670, filed Jan. 19, 1965 and now U.S. Pat. No. 3,393,239. The yields obtained using sulfuric acid as the medium are very good, but when ortho-chloroaniline has been condensed with formaldehyde in hydrochloric acid, the reaction mass agglomerates rendering the process nearly inoperable providing an unsatisfactory yield of MOCA. Aniline and alkyl substituted anilines do not present this problem of agglomeration.

SUMMARY OF THE INVENTION

It has now been found that ortho-chloroaniline can be condensed with formaldehyde in the presence of hydrochloric acid to produce high yields of MOCA without processing difficulties such as agglomeration if certain reactant proportions and temperatures are maintained.

This invention provides a process of manufacturing MOCA comprising essentially:

(a) forming an amine salt slurry by condensing formaldehyde with ortho-chloroaniline in the presence of hydrochloric acid at the temperature range of 20–50° C., the molar ratio of ortho-chloroaniline to formaldehyde being 1.9–2.0:1 and the molar ratio of hydrochloric acid to ortho-chloroaniline being at least 1.35:1;
(b) heating the amine salt slurry to a temperature between 60–105° C. for 0.5–6.0 hours forming the acid salt of MOCA;
(c) neutralizing the acid salt to form MOCA; and
(d) separating the MOCA from the aqueous phase.

DETAILS OF THE INVENTION

A preferred process of manufacturing MOCA is comprised essentially of mixing together ortho-chloroaniline, hydrochloric acid and water, agitating and blanketing with nitrogen. To the resulting slurry, a 37% solution of formaldehyde is slowly added while the temperature is maintained at 40–50° C. Upon completion of the addition of formaldehyde the temperature is raised to 95° C. over a period of one hour. During the heat-up period any suspended solids disappear yielding temporarily a homogeneous mass. While holding at 95° C., for approximately two hours, the reaction mixture forms a thin slurry of MOCA hydrochloride. The reaction mixture is then neutralized by slowly adding an excess of a 30% aqueous sodium hydroxide solution while maintaining the temperature at 95° C. The reaction mixture is then permitted to settle into two layers, the upper layer being an aqueous solution and the bottom layer being organic. The aqueous phase is separated from the organic phase by decantation. The separated organic phase is washed with water to remove salt and any residual sodium hydroxide, dried by heating to 120° C. in a vacuum and then filtered yielding about 98% of the theoretical yield of MOCA.

The filtered MOCA is fed into a Thermascrew where it is crystallized into pellets. The Thermascrew is a heat exchanger consisting of a hollow screw mounted on a hollow shaft, rotating at slow speeds in a jacketed trough. A coolant is circulated through the jacket and hollow parts. The throughput material, MOCA, fills the trough and is cooled by contact with these parts as it is mixed and conveyed forward. Commercially available Thermascrews are made by Rietz Manufacturing Company, Santa Rosa, California, and are described in their technical publication titled "Rietz Thermascrews." Alternatively, the filtered MOCA can be cast or made into flakes.

The phrase "comprised essentially" means requiring the specific components enumerated but not excluding others which do not affect the process adversely.

One method of mixing the reactants involves adding ortho-chloroaniline to hydrochloric acid then adding the formaldehyde to the resulting slurry. The formaldehyde is added slowly to the slurry of ortho-chloroaniline hydrochloride at room temperature or while the temperature is maintained below 50° C. The formaldehyde is preferably added in the form of an aqueous solution with a concentration range of 25–50% and preferably 35–40%. But it may also be added as paraformaldehyde.

The molar proportions of the reactants employed should be within the following ratios: (a) ortho-chloroaniline to formaldehyde, 1.9–2.0:1 and (b) hydrochloric acid to orthochloroaniline, at least 1.35:1 with the preferred range being 1.40–1.50:1.

When the molar ratio of ortho-chloroaniline to formaldehyde is greater than 2.0:1 an objectionable amount of unreacted ortho-chloroaniline remains in the reaction product and lowers the quality of MOCA. When the ratio is lower than 1.9:1 there is an increasing problem of crystallizing the MOCA formed due to the formation of poly-condensation products. When the ratio of hydrochloric acid to ortho-chloroaniline is lower than 1.35:1, the reaction mixture which desirably should stay in slurry form, agglomerates making further processing very difficult. When the ratio exceeds 1.5:1 the excess acid does not provide any further advantages, but requires a greater amount of neutralizing solution increasing process time and process cost.

In a manner similar to that described in U.S. application Ser. No. 632,951, filed Apr. 24, 1967 and now U.S. Pat. No. 3,496,806, this invention can be made a continuous process. The processing steps are carried out in a series of reactors in cascade arrangement. A mixture of ortho-chloroaniline and hydrochloric acid is introduced into the first reactor. Formaldehyde, conveniently as an aqueous solution, is introduced separately into the first reactor. The appropriate molar proportions must be controlled and the temperature maintained between 20 and 50° C. to obtain the condensation product in the form of an intermediate amine salt slurry.

From the condensation reaction zone, the intermediate condensation product flows into a reactor where the temperature is raised to the range of 95° C. 105° C. for 30 minutes to 180 minutes rearranging the intermediate to form the acid salt of MOCA. The reaction mass and sodium hydroxide are fed into a neutralization zone where MOCA and an aqueous salt solution are formed as separate phases. MOCA can be isolated by decantation. The MOCA is then dried by vacuum distillation, filtered and can be crystallized into pellets by feeding it through a Thermascrew.

The process of this invention has the following advantage: it permits the use of hydrochloric acid to produce acceptable yields of MOCA. Furthermore, substituting hydrochloric acid for sulfuric acid on a molar basis permits the use of less neutralizing solution to convert the acid salt of MOCA to MOCA, thereby making the process cheaper.

The following examples illustrate the process of this invention. All parts, percentages and proportions are by weight unless otherwise indicated.

EXAMPLE 1

In a reaction vessel 127.5 grams of ortho-chloroaniline (1.0 mole) is added to 168 grams of a 30.4% aqueous solution of hydrochloric acid (1.4 moles) and 300 ml. of water at room temperature. The mixture is agitated and blanketed with nitrogen. To the resulting slurry of amine hydrochloride 42 g. of a 37% aqueous solution of formaldehyde (.518 mole) are added over a period of one hour while the temperature is maintained at 40–45° C. The mole ratio of ortho-chloroaniline to formaldehyde is 1.93:1 and the mole ratio of hydrochloric acid to orthochloroaniline is 1.4:1. Upon completion of the formaldehyde addition, the emperature is increased to 95° C. over a period of one hour. The reaction mass temporarily becomes a homogeneous mixture. The temperature is maintained at a temperature of 90 to 95° C. for a period of two hours during which time MOCA hydrochloride is formed. The reaction is neutralized by slowly adding 206 g. of a 30% aqueous solution of sodium hydroxide (1.545 moles) while maintaining a temperature of 95–102° C. The reaction mass is vigorously stirred for ten minutes at 100° C. and then permitted to settle, forming an aqueous phase and an organic phase. Phase separation is accomplished by decantation. The organic phase is washed with 200 ml. of water at about 100° C. twice, then dried by heating to 120° C. at a reduced pressure of 0.5 mm. Hg and filtered by suction. Upon cooling in a nitrogen atmosphere, crystallized MOCA is formed. The yield of MOCA is 98% of the theoretical yield of MOCA. The melting range is 100.8–103.9° C. and an ortho-chloroaniline content of 0.6%.

EXAMPLE 2

Liquid MOCA manufactured as described in Example 1 is fed into a Thermascrew where it is crystallized into pellets. The pellets can then be stored and later used as desired.

What is claimed is:

1. A process of manufacturing 4,4'-methylene bis(2-chloroaniline) in the presence of hydrochloric acid consisting essentially of
    (a) forming an amine salt slurry by condensing formaldehyde with orthochloroaniline in the presence of hydrochloric acid at a temperature in the range of 20–50° C., the molar ratio of orthochloroaniline to formaldehyde being 1.9–2.0:1 and the molar ratio of hydrochloric acid to orthochloroaniline being at least 1.35:1;
    (b) heating the amine salt slurry to a temperature of 60–105° C. for 0.5–6.0 hours to form the acid salt of 4,4'-methylene bis(2-chloraniline);
    (c) neutralizing the acid salt to form 4,4'-methylene bis(2-chloroaniline); and
    (d) separating the 4,4'-methylene bis(2-chloroaniline) from the reaction mass.

2. In the process of claim 1 wherein step (d) neutralization is accomplished by adding sodium hydroxide.

3. In the process of claim 1 the addition step of crystallizing 4,4'-methylene bis(2-chloroaniline).

4. A process of claim 1 wherein the molar ratio of hydrochloric acid to ortho-chloroaniline in step (a) is in the range 1.40–1.50:1.

References Cited

UNITED STATES PATENTS

| | | | |
|---|---|---|---|
| 3,297,758 | 1/1967 | Hoeschele | 260—570 |
| 3,297,759 | 1/1967 | Curtiss et al. | 260—570 |
| 3,345,412 | 10/1967 | Hoeschele | 260—570 |
| 3,358,025 | 12/1967 | Foster et al. | 260—570 |
| 3,367,969 | 2/1968 | Perkins | 260—570 |
| 3,393,239 | 7/1968 | Wolfe | 260—570 |
| 3,476,806 | 11/1969 | Wolfe | 260—570 |
| 3,478,099 | 11/1969 | Ross et al. | 260—570 |

ROBERT V. HINES, Primary Examiner